United States Patent
Benco et al.

(10) Patent No.: US 8,175,239 B2
(45) Date of Patent: May 8, 2012

(54) METHOD AND APPARATUS FOR EFFICIENT ABBREVIATED DIALING

(75) Inventors: David S. Benco, Winfield, IL (US); Mark A. Ristich, Naperville, IL (US)

(73) Assignee: Alcatel Lucent, Paris (FR)

( * ) Notice: Subject to any disclaimer, the term of this patent is extended or adjusted under 35 U.S.C. 154(b) by 1014 days.

(21) Appl. No.: 12/156,068

(22) Filed: May 29, 2008

(65) Prior Publication Data

US 2009/0296915 A1  Dec. 3, 2009

(51) Int. Cl.
*H04M 1/56* (2006.01)

(52) U.S. Cl. .............................. 379/142.06; 379/216.01

(58) Field of Classification Search ............. 379/142.06, 379/216.01
See application file for complete search history.

(56) References Cited

U.S. PATENT DOCUMENTS

| | | | |
|---|---|---|---|
| 3,524,941 A | 8/1970 | Friese et al. | |
| 5,673,312 A * | 9/1997 | Andruska et al. | 379/207.13 |
| 5,875,240 A * | 2/1999 | Silverman | 379/142.07 |
| 6,542,733 B1 * | 4/2003 | Dennis | 455/414.1 |
| 7,113,585 B1 * | 9/2006 | Breckenridge | 379/356.01 |
| 2006/0008069 A1 * | 1/2006 | Deo et al. | 379/221.06 |
| 2007/0116219 A1 * | 5/2007 | Nasiri et al. | 379/142.01 |

FOREIGN PATENT DOCUMENTS

| | | | |
|---|---|---|---|
| GB | 1 276 707 A | | 6/1972 |
| KR | 2005056759 A | * | 6/2005 |

* cited by examiner

*Primary Examiner* — Creighton Smith
(74) *Attorney, Agent, or Firm* — Carmen Patti Law Group, LLC

(57) ABSTRACT

A system comprising an abbreviated digit constructor, an abbreviated digit analyzer and a calling line identification data store. The abbreviated digit constructor is communicatively coupled to the calling line identification data store and abbreviated digit analyzer, the abbreviated digit analyzer sends a set of abbreviated dialed digits to the abbreviated digit constructor and the abbreviated digit constructor constructs a set of unabbreviated dialed digits from the set of abbreviated dialed digits and a calling line identification retrieved from the calling line identification data store.

19 Claims, 3 Drawing Sheets

METHOD AND APPARATUS FOR EFFICIENT ABBREVIATED DIALING

TECHNICAL FIELD

The present invention is directed to a method and system for efficient abbreviated dialing.

BACKGROUND

In recent years the need for phone numbers has increased dramatically. A person may have a landline home phone number, a landline fax number, a cellular phone number, an office phone number, as well as other phone numbers. As the use of phone numbers in a particular area code grows too large, a service provider has to come up ways to accommodate the growing need for numbers in a geographical region. In the past, service providers divided a geographical region served by an area code into two geographical halves. In a first geographical half, subscribers would maintain their phone number with the original area code. In a second geographical half, subscribers would be assigned a new number with a new area code and the number they were previously assigned would be freed. Because the freed numbers had the same area code as the numbers comprising the first geographical half, the freed numbers could be assigned to new subscribers in the first geographical half. The volume of changed numbers led to misdialed and missed calls. This approach to accommodating growth in the phone numbers is no longer used.

The current approach to accommodating growth for new telephone numbers is to overlay a region with a new area code. The new area code is used for newly assigned telephone numbers. Using this method, the telephone numbers of existing customers remained the same. Unfortunately, this approach requires callers to include the country code and area code when dialing a phone number. This entails dialing eleven digits rather than the formerly required seven digits. This additional burden has been a source of frustration for local callers, particularly as technology in other domains continues to become simpler.

Thus a need exists for a way to permit callers to dial an abbreviated seven or fewer digits number when making a phone call.

SUMMARY

A system comprising an abbreviated digit constructor, an abbreviated digit analyzer and a calling line identification data store. The abbreviated digit constructor is communicatively coupled to the calling line identification data store and abbreviated digit analyzer, the abbreviated digit analyzer sends a set of abbreviated dialed digits to the abbreviated digit constructor and the abbreviated digit constructor constructs a set of unabbreviated dialed digits from the set of abbreviated dialed digits and a calling line identification retrieved from the calling line identification data store.

A method in another application, the method comprising the steps of receiving a set of abbreviated dialed digits, retrieving a calling line identification and constructing a set of unabbreviated dialed digits using fields from the calling line identification to fill in missing fields of the abbreviated dialed digits.

DESCRIPTION OF THE DRAWINGS

Features of example implementations of the invention will become apparent from the description, the claims and the accompanying drawings in which:

DETAILED DESCRIPTION

Dialing a phone number in the United States and throughout much of the world typically requires dialing a number that follows a fixed format. The fixed format defines fields comprising a phone number that may be of a fixed length. A phone number that follows a fixed format may also have fields of fixed length. Although phone numbers in other countries may not follow the exact same format as phone numbers in the United States, many countries have fixed length phone numbers. In a country with fixed length phone numbers, such as the United States, it would be beneficial if when dialing, a subscriber did not have to always dial all the digits of the full fixed length phone number. Instead, it would be beneficial if missing fields from a dialed number are filled in.

The examples and explanations described herein apply to calling in the United States. The examples and explanations, however, may be used to support efficient abbreviated dialing in any country or region with a fixed length dialing format. Herein, an unabbreviated set or string of dialed digits is a set of dialed digits that contains a country code, area code, office code, and station number. An abbreviated set of dialed digits is any set of dialed digits that contains less than all the full fields comprising a set of unabbreviated dialed digits.

Figure 1:
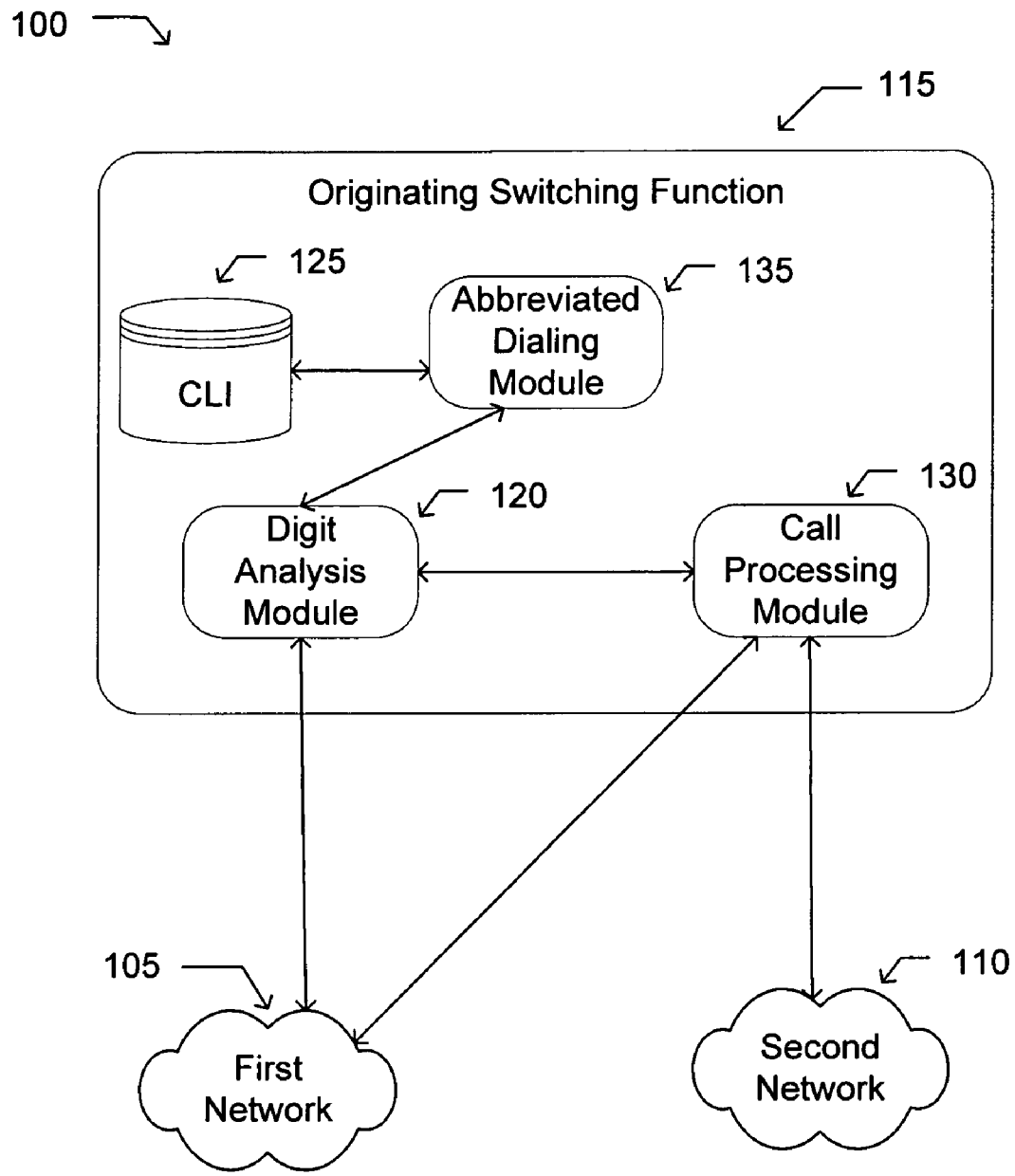
FIG. 1 is a diagram of a system in which the method and apparatus for efficient abbreviated dialing may reside.

Turning to FIG. 1, which is a diagram of a system 100 in which the method and apparatus for efficient abbreviated dialing may reside. The system 100 may be comprised of a first network 105, a second network 110, and an originating switching function 115. The first and/or second network 105, 110 may be a public switched telephone network (PSTN), a public land mobile network (PLMN), an IP multimedia subsystem (IMS), an Internet Protocol network, or any other type of network that may be used to establish a communication session between two communication devices. A communication session may be a landline telephone call, a mobile phone call, a packet switched call, or any other means of establishing a connection between two communication devices. A communication device may be a mobile phone, a landline phone, an internet phone, or any other equipment that may be used to establish a communication session.

The first and second network 105, 110 may be communicatively coupled to an originating switching function or originating switch 115. The originating switching function 115 may be a mobile switching center (MSC), a SE switch, a private branch exchange, or any other type of switching device that may be used to connect two communication devices attempting to establish a communication session. The communication path between the originating switching function 115, and the first and second networks 105, 110 may be used for signaling as well as establishing a bearer path.

Further comprising the originating switching function 115 is a digit analysis module 120, a calling line identification (CLI) data store 125, a call processing module 130, and an abbreviated dialing module 135. The digit analysis module 120 may be communicatively coupled to the first network 105, the call processing module 130 and the abbreviated dialing module 135. The digit analysis module 120 may receive dialed digits and perform analysis on the dialed digits to determine if the dialed digits comprise a valid phone number. The CLI data store 125 may be a data store containing subscriber CLIs. The CLI data store 125 may be a home location register, a visitor location register, a switch data store, or any other type of data store, node, or component of a telephony network that may store a CLI.

The call processing module 130 may be communicatively coupled to the first network 105, second network 110 and the digit analysis module 120. The call processing module 130 may perform general call processing functions in setting up and tearing down calls. The abbreviated dialing module 135 may be communicatively coupled to the digit analysis module 120 and the CLI data store 125. The abbreviated dialing module 135 may construct a set of unabbreviated dialed digits from a set of abbreviated dialed digits and a CLI.

When a subscriber dials a phone number to make a call, a set or string of dialed digits is sent from the subscriber's communication device to the digit analysis module 120. If the subscriber resides in the first network 105, the dialed digits may come in a message from the first network 105. The digits analysis module 120 may attempt to translate or parse the dialed digits. If the translation succeeds, the digit analysis module 120 may send the translated dialed digits to the call processing module 130 for further call processing. The translation may fail if the subscriber dialed an abbreviated number. In other words, the translation may fail because the dialed digits do not include a country code, area code, office code and station number. If translation of the dialed digits fails, the digit analysis module 120 may send the dialed digits to the abbreviated dialing module 135. The abbreviated dialing module 135 may perform further analysis on the dialed digits.

The abbreviated dialing module 135 may further analyze the dialed digits to determine if the dialed digits are in an abbreviated form. If the dialed digits are in an abbreviated form, the abbreviated dialing module 135 may construct an unabbreviated set of dialed digits and send the unabbreviated set of dialed digits to the digit analysis module 120 for translation. If the translation fails, the digit analysis module 120 may apply final call treatment. If the translation succeeds the digit analysis module may send the dialed digits to the call processing module 130. The call processing module 130 may use the set of dialed digits for further call processing. If the dialed digits are not in an abbreviated or unabbreviated form, the abbreviated dialing module 135 may reject the dialed digits. Rejecting the dialed digits may entail sending a failure message to the digit analysis module 120. Upon receipt of the failure message, the digit analysis module 120 may apply final call treatment by playing a message to the subscriber that informs the subscriber that the subscriber dialed an invalid set of digits. Alternatively, the abbreviated dialing module 135 or some other module in the originating switching function 115 may perform final call treatment.

If the dialed digits sent by the digit analysis module 120 indicates that the subscriber dialed a valid abbreviated number, the abbreviated dialing module 135 may construct an unabbreviated set of dialed digits using the dialed digits and a CLI. The abbreviated dialing module 135 may construct the unabbreviated dialed digits by retrieving the CLI from the CLI data store 125. The abbreviated dialing module 135 may fill in any fields missing from the abbreviated dialed digits with the digits or fields retrieved from the CLI.

Once the abbreviated dialing module 135 constructs the unabbreviated dialed digits, the abbreviated dialing module 135 may forward the unabbreviated dialed digits to the digit analysis module 120 for translation. It is worth taking a closer look at the fields that may comprise a string of dialed digits to see how the abbreviated dialing module 135 may construct a set of unabbreviated dialed digits.

Figure 2A:
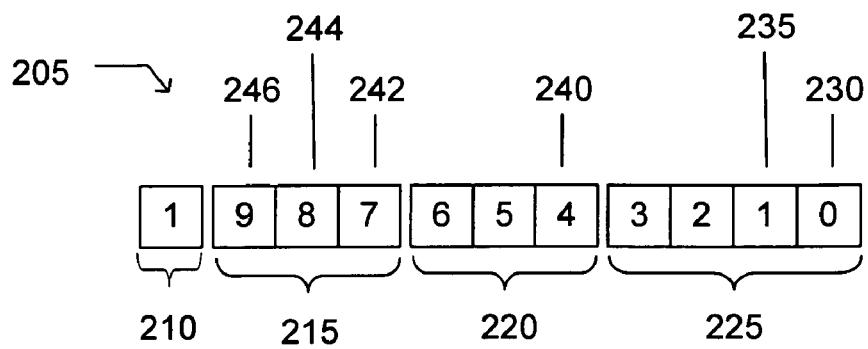
FIG. 2a is an illustration of a sample dialed digit string.

Turning to FIG. 2*a*, which depicts a string of dialed digits 205 that the digit analysis module 120 may send to the abbreviated dialing module 135. The dialed digits 205 may be comprised of four fields: a country code 210, an area code 215, an office code 220 and a station number 225. The digits comprising the dialed digits 205 may be analyzed from right to left. The furthest right digit may be considered the first digit 230. Thus the '0' digit is the first digit 230. The digit one position left of the first digit 230 may be considered the second digit 235. Thus the far right '1' may be the second digit 235, and so forth. Also, a field may have a first digit. The first digit of each field may be the furthest right digit in the field. Thus, for example, the fifth digit 240 in the digit string 205 may be the first digit of the office code 220.

In looking at the dialed digits 205 of FIG. 2*a*, the first four digits may comprise the station number 225. Digits five through seven may comprise an office code 220. Digits eight through ten may comprise an area code 215, and the eleventh digit may comprise a country code 210. An unabbreviated string of dialed digits is comprised of a country code, an area code, an office code and a station number. Thus, the string of dialed digits depicted in FIG. 2*a* is an unabbreviated string of dialed digits. An abbreviated dialed digit string is comprised of at least a station number and may be further comprised of one more complete, incomplete or empty fields.

Each field in a dialed digit string may be complete, incomplete or empty. A complete field is a field with all the digits present. For example, a complete station number is a station number comprised of four digits. An incomplete field is a field that does not have all the digits necessary to fill the field. Thus an incomplete station number is a station number comprised of, for example, three digits. An empty field is a field that has no digits. Thus, for example, a dialed digit string comprised of five digits contains a complete four digit station number, an incomplete one digit office code, an empty area code and an empty country code.

Figure 2B:
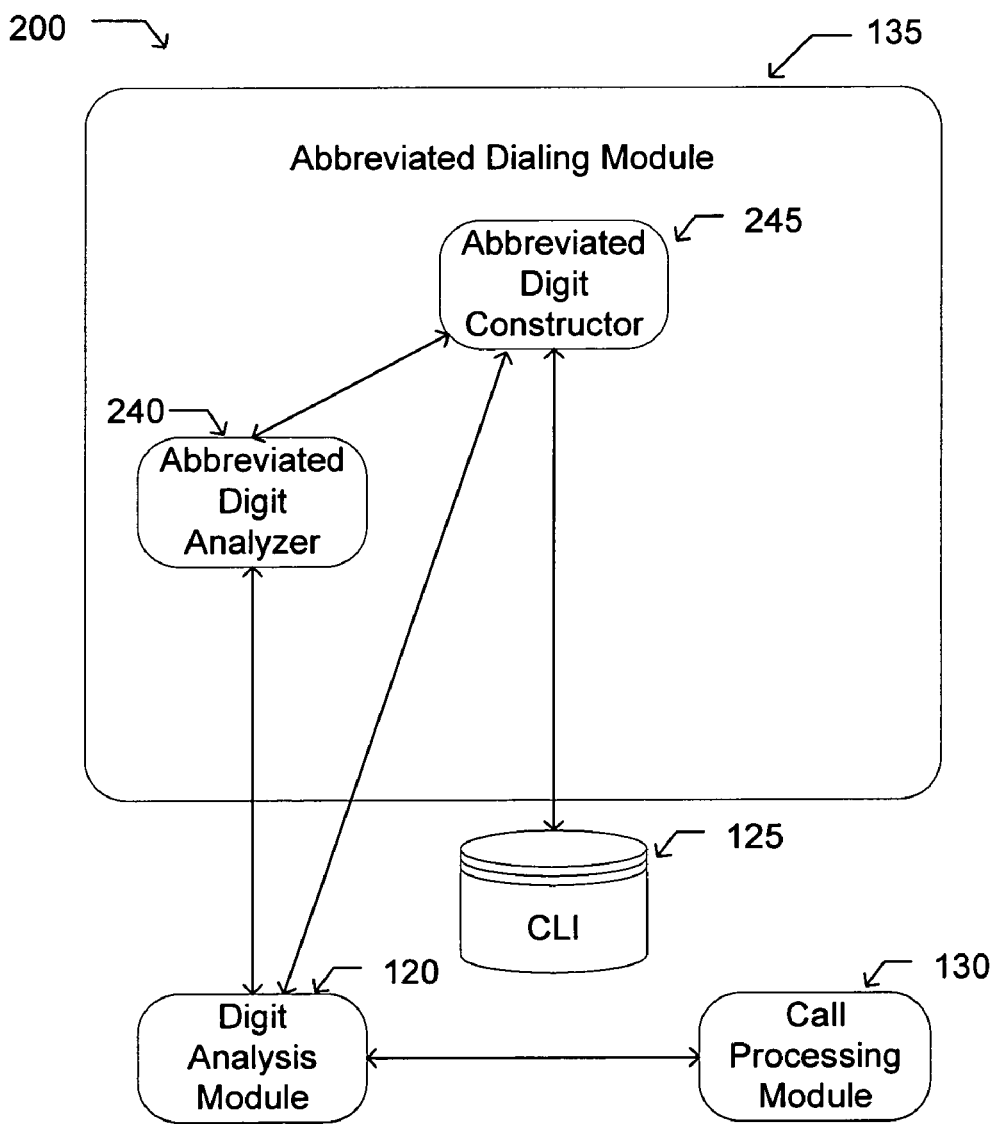
FIG. 2b is a representation of one implementation of the apparatus for efficient abbreviated dialing.

Turning to FIG. 2*b*, which is a diagram of an example system 200 for efficient abbreviated dialing. The system 200 may be comprised of the digit analysis module 120, the call processing module 130, the CLI data store 125 and the abbreviated dialing module 135. The abbreviated dialing module 135 may be further comprised of an abbreviated digit analyzer 240 and an abbreviated digit constructor 245. The abbreviated dialing module 135, the abbreviated digit analyzer 240 and the abbreviated digit constructor 245 may reside in a process, or each may be separate processes that reside on a common computing platform, or each may reside on a separate computing platform. The abbreviated dialing module 135, the abbreviated digit analyzer 240 and the abbreviated digit constructor 245 may also reside in any combination of being in different processes and/or on different computing platforms.

When a subscriber makes a phone call, the digital analysis module 120 may receive dialed digits associated with the call. The dialed digits may be received in a message, which may be an origination message of some type. The message may contain a subscriber identifier along with dialed digits and other fields necessary for originating a call. The digit analysis module 120 may perform some type of translation or parsing on the dialed digits. If the dialed digits fail translation, the digit analysis module 120 may pass the dialed digits to the abbreviated digit analyzer 240 to determine if the dialed digits are abbreviated dialed digits. If the dialed digits are unabbreviated dialed digits that are successfully translated, the digit analysis module 120 may pass the dialed digits to the call processing module 130. The call processing module 130 may proceed with any call processing associated with the dialed digits.

The abbreviated digit analyzer 240 may also analyze the received dialed digits to determine if the dialed digits are in an abbreviated form. If there are less than four digits present, the abbreviated digit analyzer 240 may inform the digit analysis module 120 that the dialed digits failed digit analysis. The digit analysis module 120 may apply final call treatment informing the subscriber that the subscriber dialed an invalid number of digits. Alternatively, the abbreviated digit analyzer 240 or some other module may perform final call treatment informing the subscriber that an invalid set of dialed digits were dialed.

If the dialed digits have more digits than the four digits needed to comprise a station number, the abbreviated digit analyzer 240 may determine if there are other complete fields in the dialed digits. In one embodiment, if the dialed digit string further comprises complete and incomplete fields the abbreviated digit analyzer 240 may apply final call treatment to the call. In another embodiment, if the dialed digits are comprised of complete and incomplete fields, the abbreviated digit analyzer 240 may send the string of dialed digits to the abbreviated digit constructor 245. If the dialed digits contain a station number and there are no other fields present in the dialed digits, the abbreviated digit analyzer 240 may send the string of dialed digits to the abbreviated digit constructor 245 for further handling.

When the abbreviated digit analyzer 240 sends dialed digits to the abbreviated digit constructor 245, the abbreviated digit analyzer 240 may send other information about the dialed digit string, such as, for example, the number of digits comprising the dialed digit string, the number of complete fields comprising the dialed digit string and a subscriber identifier. The abbreviated digit constructor 245 may use this information to construct an unabbreviated string of dialed digits.

The abbreviated digit constructor 245 may use the subscriber identifier to retrieve a CLI from the CLI data store. The CLI may be associated with a communication device that originated the communication session. The subscriber identifier may be an electronic serial number, a modified phone number, or any other identifier that uniquely identifies the communication device that originated the communication session. The CLI may be in the same format as the dialed digits depicted in FIG. 2a. In other words, the CLI may be comprised of a country code, an area code, an office code, and a station number.

In one embodiment, the abbreviated digit constructor 245 may construct an unabbreviated dialed digit string using the CLI and abbreviated dialed digits if the abbreviated dialed digits comprise a station number and one or more complete fields. If the number of digits comprising the abbreviated digits indicate that the abbreviated digit string comprises one more complete fields, any fields missing from the abbreviated dialed digits may be retrieved from the CLI and affixed to the front of the abbreviated dialed digits to construct an unabbreviated dialed digit string. For example, if ten digits comprise the dialed digit string, the dialed digits may be missing a country code. The CLI may contain a country code. The abbreviated digit constructor 245 may affix the country code of the CLI to the front of the abbreviated dialed digits to form an unabbreviated set of dialed digits. Similarly, if the number of digits comprising the abbreviated dialed digits is seven, the abbreviated dialed digits may be missing a country code and an area code. The abbreviated digit constructor 245 may affix the country code and area code of the CLI to the front of the abbreviated dialed digits to form an unabbreviated set of dialed digits. If the number of dialed digits comprising the abbreviated dialed digits is four, the abbreviated dialed digits may be missing a country code, area code and office code. The abbreviated digit constructor 245 may affix the country code, area code and office code of the CLI to the front of the abbreviated dialed digits to form an unabbreviated set of dialed digits.

In another embodiment, the abbreviated digit constructor 245 may construct unabbreviated dialed digit strings from abbreviated dialed digit strings containing a station number and one or more additional fields that may be complete or incomplete. For example an abbreviated set of dialed digits sent from the abbreviated digit analyzer 240 to the abbreviated digit constructor 245 may contain eight digits. The eight digits may comprise an office code, a station number and one digit of the area code. The one digit comprising the area code may be a first digit of the area code. For example, the first digit of the area code 215 of FIG. 2a would be the eighth digit 242 of the sample digit string 205. The abbreviated digit constructor 245 may construct an unabbreviated dialed digit string by using the second and third digits of the CLI area code to fill the second and third digits of the area code of the unabbreviated dialed digit. For purposes of illustration, the second and third digits of the area code 215 of FIG. 2a would be the ninth and tenth digits 244, 246 of the sample digit string 205. The country code of the CLI may be used as the country code of the unabbreviated dialed digits. As long as the abbreviated set of dialed digits contains at least a station number, the abbreviated digit constructor 245 may construct a complete set of dialed digits from the abbreviated set of dialed digits using the CLI that is associated with the communication device originating the call.

Once the abbreviated digit constructor 245 has constructed an unabbreviated set of dialed digits, the abbreviated digit constructor 245 may send the unabbreviated set of dialed digits to the digit analysis module 120 for translation. Whenever the abbreviated digit analyzer 240 or the abbreviated digit constructor 245 sends a dialed digit string to the digit analysis module 120 for translation, the analyzer 240 or constructor 245 may set a flag indicating that the digits have already been sent to the analyzer 240 or constructor 245. Thus the digit analysis module 120 knows not to send the digits back to the analyzer 240 or constructor 245 if the digits fail translation again.

In yet another embodiment, the abbreviated digit analyzer 240 may accept dialed digit strings comprising one or more dialed digits. Thus the abbreviated digit analyzer 240 may send a dialed digit string to the abbreviated digit constructor 245 comprising an incomplete station number and no other complete fields. The abbreviated digit constructor may complete the station number and other fields of the dialed digit string using a CLI in the same manner as described above.

The system 200 in one example comprises a plurality of components such as one or more of computer software components. A number of such components can be combined or divided in the system 200. An example component of the system 200 employs and/or comprises a set and/or series of computer instructions written in or implemented with any or a number of programming languages, as will be appreciated by those skilled in the art. The system 200 in one example comprises a vertical orientation, with the description and figures herein illustrating one example orientation of the system 200, for explanatory purposes.

The system 200 in one example employs one or more computer-readable signal-bearing media. The computer-readable signal-bearing media store software, firmware and/ or assembly language for performing one or more portions of one or more implementations of the invention. The computer-readable signal-bearing medium for the system 200 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

Figure 3:
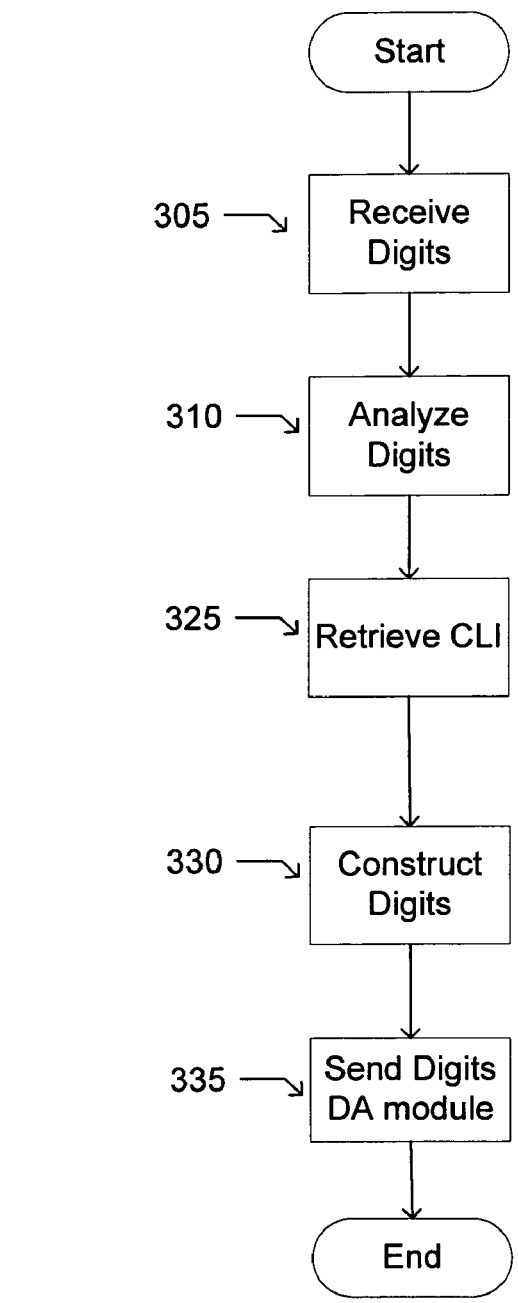
FIG. 3 is a representation of one implementation of a method for efficient abbreviated dialing.

Turning now to FIG. 3, which is a flow chart of a method 300 for efficient abbreviated dialing. The method 300 begins in a state ready to receive a string or set of dialed digits. The method 300 receives a string of dialed digits 305. The method 300 analyzes the dialed digits 310 to determine which digits need to be added to the dialed digits to form an unabbreviated set of dialed digits. In an embodiment, the method 310 may apply final call treatment if the dialed digits do not comprise at least a complete station number.

The method 300 retrieves a CLI 325 from, for example, the CLI data store 125. The method 300 may retrieve the CLI from the CLI data store 125 using, for example, a subscriber identifier that may be associated with the dialed digits. The method 300 may construct an unabbreviated set of dialed digits 330 using the abbreviated dialed digits and the CLI as described in relation to FIGS. 1 and 2. After an unabbreviated set of dialed digits is constructed, the method 300 may send the constructed dialed digits to the digit analysis module 335 to complete call handling. The method may set a flag or indicator, which informs the digit analysis module 120 that the sent digits are constructed dialed digits. If the constructed dialed digits fail translation again, the digit analysis module 120 should not try to reconstruct the digits a second time by sending the digits to the method 300.

The steps or operations described herein are just for example. There may be many variations to these steps or operations without departing from the spirit of the system 200 and method 300. For instance, the steps may be performed in a differing order, or steps may be added, deleted, or modified.

Although example implementations of the system 200 and method 300 have been depicted and described in detail herein, it will be apparent to those skilled in the relevant art that various modifications, additions, substitutions, and the like can be made without departing from the spirit of the method 300 and these are therefore considered to be within the scope of the system 200 and method 300 as defined in the following claims.

We claim:

1. A system comprising:
an abbreviated digit constructor; and
an abbreviated digit analyzer,
wherein the abbreviated digit constructor is communicatively coupled to the abbreviated digit analyzer; and
wherein the abbreviated digit analyzer is configured to send a set of abbreviated dialed digits to the abbreviated digit constructor; and
wherein the abbreviated digit constructor is configured to construct a set of unabbreviated dialed digits from the set of abbreviated dialed digits and a calling line identification retrieved from a calling line identification data store.

2. The system of claim 1 wherein the unabbreviated set of dialed digits further comprises a set of dialed digits comprised of a plurality of fixed length fields.

3. The system of claim 2 wherein the plurality of fixed length fields further comprises a country code, an area code, an office code and a station number.

4. The system of claim 3 wherein the abbreviated set of dialed digits further comprises at least one complete field.

5. The system of claim 4 wherein the calling line identification is retrieved based on a subscriber identifier.

6. The system of claim 4 wherein the at least one complete field is the station number.

7. The system of claim 6 wherein:
if the set of abbreviated dialed digits is missing a country code digit, a corresponding country code digit of the calling line identification is affixed to the abbreviated dialed digits to form the a set of unabbreviated dialed digits;
if the set of abbreviated dialed digits is missing the country code digit and an area code digit, then the corresponding country code digit and a corresponding area code digit of the calling line identification may be affixed to the abbreviated dialed digits to form the set of unabbreviated dialed digits; and
if the set of abbreviated dialed digits is missing the country code digit, the area code digit and an office code digit, then the corresponding country code, the corresponding area code digit and a corresponding office code digit of the calling line identification may be affixed to the abbreviated dialed digits to form the set of unabbreviated dialed digits.

8. The system of claim 7 wherein:
if the set of abbreviated dialed digits is missing the digits of the country code and has incomplete digits for the area code, then a corresponding digits for the country code and missing digits of the area code are retrieved from the calling line identification and affixed to the abbreviated dialed digits to form the set of unabbreviated dialed digits; and
if the set of abbreviated dialed digits is missing the digits of the country code, missing the digits of the area code, and has incomplete digits for the office code, then corresponding digits for the country code, corresponding digits for the area code and missing digits of the office code are retrieved from the calling line identification and affixed to the abbreviated dialed digits to form the set of unabbreviated dialed digits.

9. The system of claim 8 further comprising:
a digit analysis module; and
a call processing module;
wherein the digit analysis module is communicatively coupled to the abbreviated digit analyzer, the call processing module and the abbreviated digit constructor; and
wherein the call processing module is communicatively coupled to the digit analysis module; and
wherein the digit analysis module is configured to send a set of dialed digits to the abbreviated digit analyzer; and
wherein the abbreviated digit analyzer is configured to analyze the set of dialed digits; and
wherein the digit analysis module is configured to send the set of unabbreviated dialed digits to the call processing module for further call processing.

10. The system of claim 9 wherein the digit analysis module applies final call treatment if the set of dialed digits fails digit translation.

11. The system of claim 10 wherein the digit analysis module sends the set of unabbreviated dialed digits to the call processing module for further call processing if the set of unabbreviated dialed digits are successfully translated.

12. The system of claim 10 wherein the abbreviated digit constructor sends the set of unabbreviated dialed digits to the digit analysis module for translation.

13. A method comprising:
receiving a set of abbreviated dialed digits;

retrieving a calling line identification from a calling line identification data store;

constructing a set of unabbreviated dialed digits using digits of fields from the calling line identification to fill in missing digits of corresponding fields of the set of abbreviated dialed digits; and sending the set of unabbreviated dialed digits to a digit analysis module for translation.

14. The method of claim 13 further comprising:

analyzing the set of abbreviated dialed digits to determine if the set of abbreviated dialed digits comprise at least a complete first field; and applying final call treatment if the set of abbreviated dialed digits do not comprise at least a complete first field.

15. The method of claim 14 wherein the first field is a station number.

16. The method of claim 13 wherein the retrieving the calling line identification further comprises:

retrieving the calling line identification from the calling line identification data store based on a subscriber identifier.

17. The method of claim 13 wherein the constructing the set of unabbreviated dialed digits further comprises:

constructing the set of unabbreviated dialed digits when the set of abbreviated dialed digits is missing a country code digits by affixing corresponding country code digits of the calling line identification to the set of abbreviated dialed digits;

constructing the set of unabbreviated dialed digits when the set of abbreviated dialed digits is missing the country code digits and an area code digit by affixing the corresponding country code digits and a corresponding area code digit of the calling line identification to the set of abbreviated dialed digits; and constructing the set of unabbreviated dialed digits when the set of abbreviated dialed digits is missing the country code digits, the area code digits and an office code digit by affixing the corresponding country code digits, the corresponding area code digits and a corresponding office code digit of the calling line identification to the set of abbreviated dialed digits.

18. The method of claim 13 wherein the constructing the set of unabbreviated dialed digits further comprises:

constructing the set of unabbreviated dialed digits when the set of abbreviated dialed digits is missing a country code digits and has area code digits that are incomplete by affixing to the set of abbreviated dialed digits from the calling line identification corresponding country code digits and one or more area code digits that correspond to missing digits of the area code digits that are incomplete;

constructing the set of unabbreviated dialed digits when the set of abbreviated dialed digits is missing the country code digits, missing the area code digits, and has office code digits that are incomplete by affixing to the set of abbreviated dialed digits from the calling line identification the corresponding country code digits, corresponding area code digits and one or more office code digits that correspond to missing digits of the office code digits that are incomplete; and constructing the set of unabbreviated dialed digits when the set of abbreviated dialed digits is missing the country code digits, missing the an area code digits, missing the a office code digits, and has station number digits that are incomplete by affixing to the set of abbreviated dialed digits from the calling line identification the corresponding country code digits, the corresponding area code digits, corresponding office code digits, and one or more station code digits that correspond to missing digits of the station number digits that are incomplete.

19. The method of claim 13 further comprising:

analyzing the set of abbreviated dialed digits to determine if the set of abbreviated dialed digits comprise at least one digit; and applying final call treatment if the set of abbreviated dialed digits do not comprise at least a complete first field.

* * * * *